Jan. 9, 1962 C. L. CLEVENGER 3,016,116
RETAINING MEANS FOR CONSTRUCTION PANELS
Filed July 22, 1958
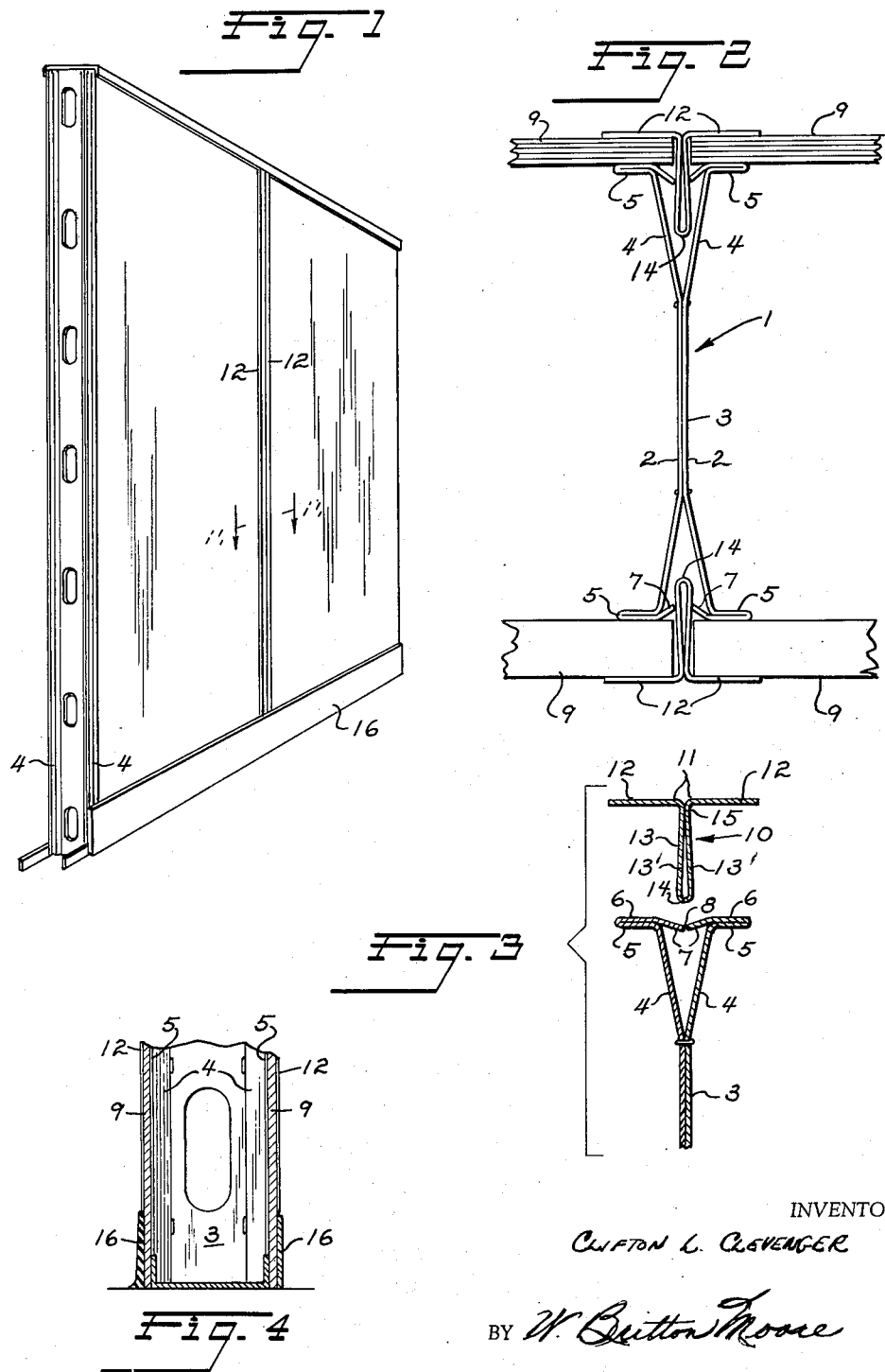
INVENTOR
CLIFTON L. CLEVENGER
BY W. Britton Moore
ATTORNEY

3,016,116
RETAINING MEANS FOR CONSTRUCTION PANELS
Clifton L. Clevenger, 5020 55th Ave., Hyattsville, Md.
Filed July 22, 1958, Ser. No. 750,241
1 Claim. (Cl. 189—34)

This invention relates to improved means for readily assembling and disassembling dry wall construction panels.

The principal object of the present invention is the provision of novel metal studding and clip members for use in construction whereby partitions, sheathing and similar panels may be easily assembled in substantially abutting relation by relatively unskilled labor.

A further object is to provide a novel combined metal studding and molding clip adaptable for use in assembling partitions, sheathing and similar panels in buildings so that the latter will be in substantial abutting relation and the outer faces thereof will be practically flush in appearance.

Another object is to provide a novel combined metal studding and molding clip for use in assembling partition and sheathing panels in buildings without the use of exposed nails or other retaining means and whereby the panel joints are not exposed and do not require the application of spackling, taping, or other covering and retaining means.

Still another object is the provision of novel combined metal studding and molding clip adapted for readily assembling and disassembling partitions, sheathing and similar panels in buildings without the use of special tools, and whereby the studding is provided with openings to permit assembly of electrical wiring and various piping.

A still further object is the provision of novel combined elongated corrosion-resistant, electro-galvanized steel studding and molding clips with the clips being readily inserted in continuous slots in the studding and being so arranged that the clips are adapted to retain construction panels of varying thicknesses, for example conventional ¼ inch and ½ inch panels.

Still another object is to provide a novel metal molding clip which is adapted to be readily inserted in an elongated slot in a metal studding and having means for locking the molding therewithin whereby the molding will overlap the adjoining edges of the panels and will protrude only slightly beyond the outer faces of the panels.

A further object is the provision of novel combined metal studding and molding clips which may be readily installed and whereby the molding may be easily removed to permit of removal and substitution of panels without damage thereto.

These and other objects will be apparent by referring to the following drawings wherein:

FIGURE 1 is a perspective view of my novel combined studding and molding clip construction with adjoining panels in assembled position;

FIGURE 2 is a section on the line 2—2 of FIGURE 1, showing the assembly of pairs of panels of varying thicknesses;

FIGURE 3 is an exploded view showing the relative positions assumed by the studding and one molding clip prior to assembly of the panels; and FIGURE 4 is a section on the line 4—4 of FIGURE 1, showing the floor or base section of the assembled wall construction with a covering molding in position.

Referring more particularly to the drawings, wherein similar reference characters designate like parts throughout the several views, numeral 1 designates generally an elongated metal studding, which may be of corrosion-resistant, electro-galvanized steel, or other suitable metal, such as, aluminum. The studding is formed from two elongated mating metal sheets 2—2 having flattened in their mid-sections to abut and flushly engage each other, as at 3, which flat sections may be suitably secured together by any suitable means, such as welding, not shown. The sheets 2—2, at either side of the flat mid-sections 3, diverge angularly outwardly in opposed directions, as at 4—4, and the outer ends thereof are bent outwardly or laterally, as at 5—5, and thence overlapped or bent inwardly in opposed directions, as at 6—6. Formed on the inner opposed ends of sections 6—6 are angularly and inwardly bent marginal edge portions 7—7, the free inner ends of which are slightly spaced from each other to provide a continuous elongated slot or opening 8 to accommodate a molding clip, hereinafter described. It will be noted that the laterally bent and overlapped sections 5—5 and 6—6 present substantially flat faces which flatly engage the inner faces of adjoining construction panels 9.

It will be understood that the elongated metal studding units 1 are arranged in vertical position in suitable spaced relation and extend from floor to ceiling of a room, with the terminal ends thereof being suitably anchored in position. Thus, large standard construction wall panels 9, such as "Sheetrock," "Plywood," "Marlite" and the like, may now be arranged so that the elongated adjoining edges of a pair of panels will flatly engage the outer faces of sections 6—6 of the studs, with the edge portions 7—7 of the sections 6—6 extending inwardly and being spaced from the panel edges, as best shown in FIGURE 2. When the panels 9 are so positioned, elongated substantially T-shaped metal molding clips 10, also preferably of corrosion-resistant, electro-galvanized steel or other suitable metal, such as aluminum, are mounted relative to the studding. Each clip 10 is formed from a single elongated sheet of metal which is bent or folded along the lines 11 to provides two laterally extending substantially flat flanges 12—12 and an inwardly extending web 13. The latter is formed from the walls 13'—13' which are bent or folded at their inner ends, as at 14. Thus, the web walls 13'—13' abut and are integral with each other at their outer edges, as at 15, and then progressively angularly diverge to their inner fold line 14, as best illustrated in FIGURES 2 and 3, to provide a gradually thickened inner end area. In other words, the outer ends of the web walls 13'—13' abut in integral relation with each other so that only a relatively shallow groove or recess remains between the flanges 12—12, and the web walls diverge inwardly in opposed directions to provide an enlarged inner end portion.

It will thus be understood that the web 13 of a molding clip 10 is inserted between the slightly spaced adjoining edges of two wall panels 9 and the application of pressure to the flanges 12—12 thereof forces the web 13 between the free edge portions 7—7 of studding 1 until the flanges 12—12 flatly engage the outer faces of wall panels 9 so that edges of the panel are clamped between the sections 6—6 of the studding 1 and the flanges 12—12 of the clip 10, as shown in FIGURE 2. Therefore, it is apparent that the edge portions 7—7 of the studding will snugly engage the diverging web walls 13'—13' and lock or retain the clip within the studding. When the panels are so assembled, it will be understood that the panels are securely locked in position due to the coaction between the studding and clips and cannot be accidentally dislodged therefrom. It is the usual practice to apply a floor molding strip 16 over the base of the panels and clips, as shown, for example, in FIGURE 1. It will also be apparent that the outer faces of the panels and clips may be painted, or otherwise decorated, whereupon the flanges 12—12 of the latter will be hardly noticeable.

In FIGURE 2, ½ inch panels are shown as being clamped by one molding clip, whereas ¼ inch panels are being clamped by the molding clip at the opposite end of the studding. In the latter case, it will be noted that the clip web extends further into the slot between the edge portions 7—7 which will still snugly engage the web and retain the same therebetween.

If it is necessary to remove a panel or panels for any reason, it is only necessary to remove the molding strip 16 and to insert a sharp or pointed tool under one of the flanges 12—12 and to pry the web 13 of the molding clip outwardly from the slot between the edge portions 7—7 of studding 1. The panel may then be slipped out from between the flange 12 and section 6 of the studding, in an obvious manner.

While I have shown and described a preferred embodiment of my novel studding and clip, it will be apparent that various changes and improvements may be made therein without departing from the scope and spirit of the appended claim.

What I claim is:

Structure for assembling wall panels in edge-to-edge coplanar arrangement, comprising: a pair of coextensive stud-defining relatively straight strips of sheet material having their medial portions interconnected throughout the lengths thereof and their lateral portions diverging at least along one edge thereof to define a trough-like recess, the margins of said diverging portions being first bent coplanarly away from each other, next bent coplanarly toward each other to provide double-thickness coplanar flanges substantially perpendicular to a plane defined by the contacting surfaces of said medial portions, and finally bent toward each other and inwardly of the mouth of said recess, and a clip member formed of a third strip of sheet material of a length substantially equal to that of said first-mentioned strips bent into T-shaped cross-section with its marginal portions defining coplanar flanges forming halves of the cross bar of the T and with its central portion defining a two-lamina stem of said T, the laminae of which stem diverge slightly toward and are integrally joined at the free end of the stem by an integral rounded portion to provide a rounded-end tapered tongue for easy insertion between and binding engagement with the edges of the said stud-defining strips inturned at the mouth of said recess, whereby the adjacent edges of coplanar wall panels of various thickness can be quickly and easily fixed to the face of the stud defined by said strips, with the edges of said panels held thereagainst and covered by the oppositely extending flanges of said clip.

References Cited in the file of this patent

UNITED STATES PATENTS

| | | |
|---|---|---|
| 946,742 | Tweet | Jan. 18, 1910 |
| 1,576,527 | McBride | Mar. 16, 1926 |
| 2,138,195 | Place | Nov. 29, 1938 |
| 2,633,945 | Millier | Apr. 7, 1953 |

FOREIGN PATENTS

| | | |
|---|---|---|
| 126,233 | Australia | Dec. 10, 1947 |
| 511,174 | Belgium | May 31, 1952 |